July 20, 1965 DE MYLES T. HERBERG 3,195,818
SPRINKLER HOSE SWIVEL STAKE

Filed Sept. 9, 1963

INVENTOR.
DE MYLES T. HERBERG
BY Knox & Knox

United States Patent Office 3,195,818
Patented July 20, 1965

3,195,818
SPRINKLER HOSE SWIVEL STAKE
De Myles T. Herberg, 8888 Hammond Drive,
San Diego 23, Calif.
Filed Sept. 9, 1963, Ser. No. 307,686
5 Claims. (Cl. 239—276)

This invention relates to water sprinkling systems and particularly to apparatus for anchoring the unconnected end of a sprinkling and soaking hose.

Background

Sprinkling and soaking hoses of the type discussed herein are designed to deliver small streams of water by means of perforations distributed along the length and on one side of the hose. For watering a particular area, the hose is stretched out on the ground, the water is turned on, and the hose usually is left unattended until the desired watering is accomplished. For sprinkling, the hose is arranged with the perforations facing sideward or upward, while for soaking the perforations are directed downward.

Initial arrangement of the hose in a desired location with the perforations facing in the proper direction is a tedious operation, particularly if the hose is cold and stiff or hot and too pliable. Additionally, after initial arrangement, the position of the hose shifts from force of the water when turned on, requiring rearrangement of the hose with consequent sprinkling of both the operator and undesired areas. After a particular area has been watered sufficiently, the hose must be moved to an adjacent location by repeating the entire operation.

The instant invention eliminates the above discussed disadvantages of the prior art by providing anchoring and swiveling means for the unconnected end of a sprinkling and soaking hose so that the hose may be anchored; then rotated and moved laterally while anchored. By this means, the operator may shift the position and location of the hose with the water turned on by grasping the unperforated supply hose while staying beyond sprinkling range.

Objects

It is a principal object of this invention to provide means for anchoring the unconnected end of a water sprinkling and soaking hose.

It is another object of this invention to provide means for anchoring the unconnected end of a water sprinkling and soaking hose, said means including facilities permitting shifting the anchored hose to different areas and rotating the anchored hose between the sprinkling and soaking positions.

It is still another object of this invention to provide a combination anchoring stake and swivel closure that may be used with a variety of water sprinkling and soaking hoses.

With these and other objects definitely in view, this invention consists in the novel combination and arrangement of elements as will be hereinafter fully described in the specification, particularly pointed out in the claims, and illustrated in the drawings that form a material part of this disclosure, and in which:

Similar characters of reference indicate similar or identical elements and portions throughout the specifications and throughout the views of the drawing.

Detailed description

Figure 1:
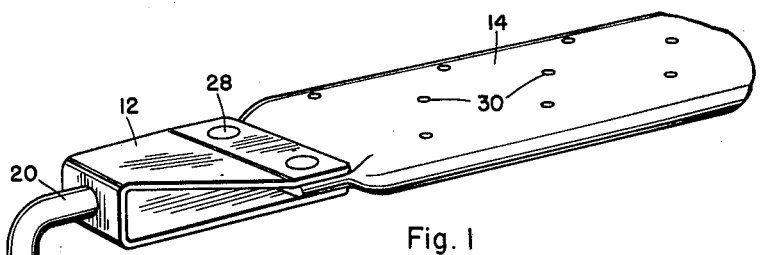
FIGURE 1 is a perspective view of the anchoring stake and swivel member attached to a hose.

One embodiment of the instant invention is illustrated in FIGURE 1, where anchoring stake 10 with swivel member 12 provides means for anchoring the end of a hose 14 designed for sprinkling and soaking lawns and the like.

Anchoring stake 10 has a long shank portion 16 with pointed end 18 facilitating driving the stake into the ground to a desired depth. Short portion 20 is bent to form a right angle with long portion 16, and is terminated in a portion of reduced diameter providing pivot pin 22.

Swivel closure member 12 is substantially U-shaped with sides divergently tapered toward the closed end. The closed end or bright portions is apertured as at 24 to receive a pivot pin 22. The pivot pin has a retaining head 26 keeping swivel member 12 secured in pivotal relation to anchoring stake 10, swivel closure member 12 being free to rotate through 360 degrees about pivot pin 22. The open end of swivel closure member 12 is rigidly attached to the closed and unconnected end of hose 14 by means of rivets 28 or the equivalent.

Hose 14 may be any of the available types designed for sprinkling and soaking. As illustrated, hose 14 has a number of laterally and longitudinally spaced perforations 30 extending substantially throughout the entire length on one side of the hose. The perforations, however, may be disposed in any other desired pattern, such as in a single line.

Figure 2:
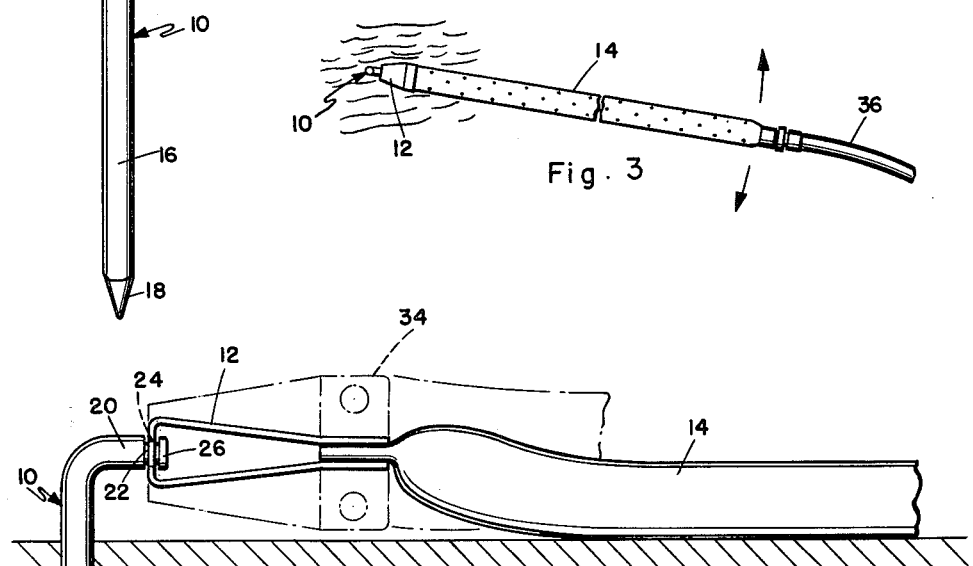
FIGURE 2 is a side elevation view thereof illustrating the rotation feature.

In FIGURE 2, the invention is shown with swivel 12 rotated 90 degrees from a sprinkling position of FIGURE 1 to position 34, as indicated in chainlines. Thus, it is apparent that the invention provides a convenient method for anchoring and rotating a hose selectively into the sprinkling or soaking position, the hose being in the soaking position when the perforations are facing the ground and in the sprinkling position when the perforations are facing sideward or upward.

Figure 3:
FIGURE 3 is a diagrammatic view illustrating the hose relocation feature.

Lateral movement of the hose by rotating the anchoring stake is illustrated by the arrows in FIGURE 3, where anchoring stake 10 is shown driven into the ground and sprinkling and soaking hose 14 is shown connected to unperforated supply hose 36.

From the foregoing description of one embodiment of the invention, it is apparent that the swivel attachment provides means for rotating the hose into the sprinkling or soaking position, and rotation of the anchoring stake provides means for moving the hose laterally from one location to another. The anchoring stake and swivel member in this embodiment may be permanently attached to the hose for sale as a single unit or may be furnished separately for attachment by the user.

Figure 4:
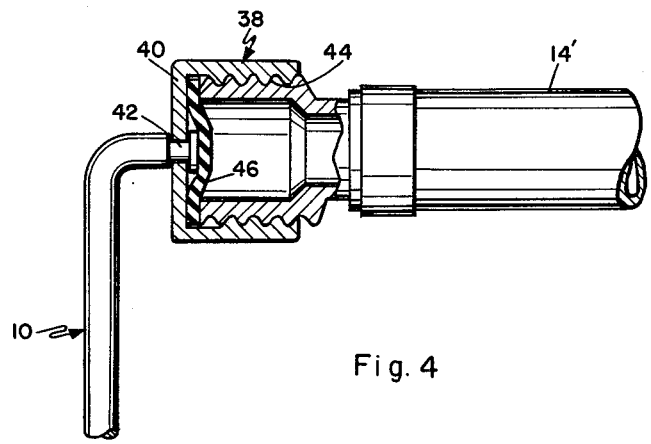
FIGURE 4 is a side elevation view, partially cut away, of an alternative swivel member.
Figure 5:
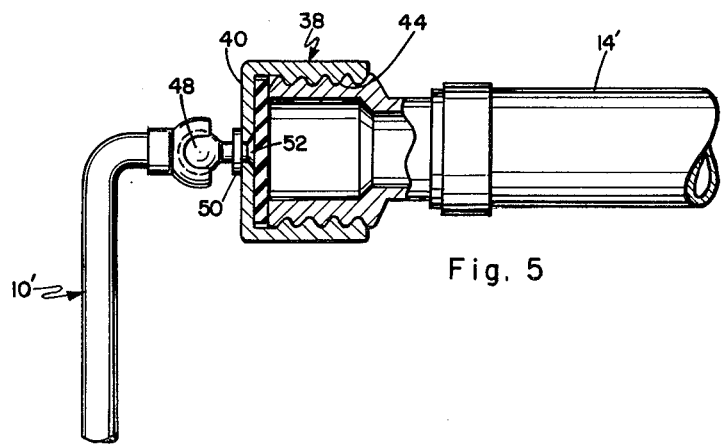
FIGURE 5 is a similar view of another alternative swivel member.

FIGURES 4 and 5 illustrate embodiments of the invention designed for attachment to extension hose sections having threaded connection fittings at both ends. In both these figures, cylindrical swivel closure member 38 has a closed end 40 with a central aperture 42. Swivel closure member 38 also includes an internally threaded socket 44 designed for engaging an externally threaded hose connection fitting as shown. Gasket 46 provides a tight seal.

In FIGURE 4, anchoring stake 10 includes a pivot pin and retaining head, the same as in FIGURE 1. Consequently operation of this embodiment is the same as described above.

In FIGURE 5, swivel closure member 38 includes a ball-and-socket fitting 48, with the socket portion rigidly attached to anchoring pin 10' and the ball portion rigidly attached to swivel member 38 by means of a pin radially extending from the ball portion and having a flange 50, and retaining head 52 formed on the pin. In this embodiment, ball-and-socket fitting 48 permits rotating the hose through 360 degrees and moving the hose radially in any direction without disturbing anchoring pin 10'.

It is understood that minor variation from the forms of the invention disclosed herein may be made without departure from the spirit and scope of the invention, and that the specification and drawing are to be considered as merely illustrative rather than limiting.

I claim:

1. In a watering system, the combination comprising:
   a flexible, perforated hose of the type having means for connection of one end thereof to a source of pressurized water;
   swivel closure means closing the other end of said hose;
   anchoring means attached to said swivel closure means, said anchoring means tethering said swivel closure means and said other end against movement axially of the hose, and enabling free rotational adjustment of said hose, when anchored, about the longitudinal axial of the hose.

2. The combination of claim 1 wherein said swivel closure means is substantially U-shaped bracket clamping said other end, and having a bight portion rotatably attached to one end of said stake.

3. In a watering system having a flexible, perforated hose, the combination comprising:
   an elongated stake having a long portion with a pointed end and a short portion bent to form a right angle; and
   a swivel closure member pivotally attached to the free end of said short portion and closing one end of said hose.

4. Apparatus according to claim 3 in which said swivel closure member is substantially U-shaped forming a bight portion pivotally attached to the end of said short portion.

5. Apparatus according to claim 3 in which said swivel closure member is cylindrical with a closed end rotatably attached to the end of said short portion, and a threaded socket providing means for connection to an externally threaded fitting on said hose.

References Cited by the Examiner

UNITED STATES PATENTS

| | | | |
|---|---|---|---|
| 395,726 | 1/89 | Walter | 239—276 |
| 533,113 | 1/95 | Milburn | 248—88 |
| 648,263 | 4/00 | Hull | 239—276 |
| 1,058,189 | 4/13 | McBoyle | 239—275 |
| 1,470,123 | 10/23 | Smith | 248—88 |
| 2,535,723 | 12/50 | Combs | 239—275 |
| 2,657,096 | 10/53 | Holmes | 239—276 |
| 2,694,538 | 11/54 | Consold et al. | 248—88 |
| 2,757,962 | 8/56 | MacLeod | 239—276 |
| 2,954,194 | 9/60 | Alfano | 239—276 |
| 3,091,401 | 5/63 | Hurby | 239—567 |

FOREIGN PATENTS 127,267   3/48   Australia.

EVERETT W. KIRBY, *Primary Examiner*.